United States Patent [19]

Swetnam et al.

[11] 4,367,621
[45] Jan. 11, 1983

[54] CROP HARVESTER INCLUDING A QUICKLY ADJUSTABLE SEMI-FLOATING, SELF-STEERING CUTTER HEAD

[75] Inventors: Larry D. Swetnam; James H. Casada; Linus R. Walton, all of Lexington, Ky.

[73] Assignee: The University of Kentucky Research Foundation, Lexington, Ky.

[21] Appl. No.: 252,315

[22] Filed: Apr. 9, 1981

[51] Int. Cl.³ .................... A01D 45/16; A01D 55/00; A01D 91/04
[52] U.S. Cl. ...................................... 56/10.2; 56/27.5; 56/121.41
[58] Field of Search ...................... 56/10.2, 11.8, 11.5, 56/121.41, 27.5, DIG. 22, 11.9, 15.8, DIG. 15; 46/213

[56] References Cited

U.S. PATENT DOCUMENTS

| | | | |
|---|---|---|---|
| 2,813,390 | 11/1957 | Irvine | 56/27.5 |
| 2,862,343 | 12/1958 | Wood | 56/DIG. 22 |
| 2,862,345 | 12/1958 | Wigham | 56/119 |
| 2,888,778 | 6/1959 | Cartier | 46/213 |
| 2,949,004 | 8/1960 | Jones | 56/DIG. 22 |
| 3,077,065 | 2/1963 | Samways et al. | 56/DIG. 22 |
| 3,283,486 | 11/1966 | Marek et al. | 56/DIG. 22 |
| 3,706,186 | 12/1972 | Hurlburt et al. | 56/15.8 |
| 3,717,952 | 2/1973 | Strongin | 46/213 |
| 4,176,560 | 12/1979 | Clarke | 56/11.1 |
| 4,195,860 | 4/1980 | Helams | 56/15.5 |
| 4,197,690 | 4/1980 | Eistert et al. | 56/10.2 |
| 4,216,642 | 8/1980 | Spratt et al. | 56/27.5 |
| 4,295,323 | 10/1981 | Maier et al. | 56/10.2 |

FOREIGN PATENT DOCUMENTS

| | | | |
|---|---|---|---|
| 1407734 | 10/1968 | Fed. Rep. of Germany | 56/10.2 |
| 2354971 | 5/1974 | Fed. Rep. of Germany | 56/10.2 |

*Primary Examiner*—Paul J. Hirsch
*Attorney, Agent, or Firm*—Birch, Stewart, Kolasch & Birch

[57] ABSTRACT

The present invention is directed to an easily adjustable, semi-floating, self-steering cutter head for row crops. The present invention incorporates self-steering capabilities, a cut-off mechanism and a quick-adjustment into a single integral unit. Direction sensing is accomplished by utilizing a feeler arm or a set of feeler arms which follow the plant stock row or other protrusions or indentations. Forces detected by the guidance sensors are transmitted to a ring which is a part of the housing and/or shielding of the cut-off device. The steering forces may be transmitted to a steering system through a single connection. The present invention is particularly useful in harvesting tobacco.

25 Claims, 4 Drawing Figures

CROP HARVESTER INCLUDING A QUICKLY ADJUSTABLE SEMI-FLOATING, SELF-STEERING CUTTER HEAD

BACKGROUND OF THE INVENTION

1. Field of the Invention

The present invention is directed to an adjustable semi-floating, self-steering cutter head for use in harvesting row crops.

2. Description of the Prior Art

A number of harvesting machines have been developed wherein a cutter mechanism is used in conjunction with a self-steering device. A conventional self-steering device incorporates sensors disposed adjacent to an outside portion of the agricultural equipment to sense the presence of an article being severed. Examples of such prior art self-steering mechanisms are disclosed by Brooks, U.S. Pat. No. 3,430,723; Chapman, U.S. Pat. No. 3,780,507; Stubbe, U.S. Pat. No. 3,797,208; Stamper et al, U.S. Pat. No. 3,952,828; Gail, U.S. Pat. No. 4,126,984; Coenenberg et al, U.S. Pat. No. 4,166,349; and Eistert et al, U.S. Pat. No. 4,197,690. In addition, the Sallee Patent, U.S. Pat. No. 3,088,264 discloses an automatic header control means wherein feelers 50 extend downwardly into contact with the subjacent ground. Similarly, the Matthews Patent, U.S. Pat. No. 2,972,847 discloses an automatic positioning means wherein plant lifters 22 and 23 are disposed adjacent to a row of crops to be processed.

A number of devices have been developed for harvesting row crops. For example, the Meyer Patent, U.S. Pat. No. 3,249,366, discloses an automatic steering mechanism which includes guard members 70 and 72. The guard members are positioned adjacent to cutters 60 and 62. The frame member 64 is suspended from a rod 74 attached to a spring 76. The cutter assembly disclosed by Meyer is designed to work in combination with a conveyor or elevator 31.

The Spratt et al, U.S. Pat. No. 4,216,642, discloses a tobacco harvesting machine wherein a cutter 36 is utilized to sever a row of tobacco crops. An individual standing on the platform 28 grabs the severed tobacco stock and positions it on the stake 80. Thereafter, the stake 80 is raised and disposed on the deck 88 for temporary storage until the severed tobacco stocks are deposited onto the ground surface.

SUMMARY AND OBJECTS OF THE INVENTION

It is an object of the present invention to provide an easily adjustable, semi-floating, self-steering cutter head for row crops which is disposed as a single integral unit.

Another object of the present invention is to provide a harvesting machine wherein the operator is seated in a comfortable position where he can conveniently harvest the row crops.

A further object of the present invention is to provide a feeler arm or a set of feeler arms which follow the plant stock row or other protrusions or indentations. The feeler arm or set of feeler arms are capable of movement in a vertical direction.

A further object of the present invention is to provide a harvesting machine which is relatively simple which reduces the cost of manufacturing and enhances the mechanical reliability.

These and other objects of the present invention are accomplished by providing a harvesting aid wherein an easily adjustable, semi-floating, self-steering cutter head for row crops is disposed adjacent to the forward portion of the harvesting aid. The harvesting aid includes a chair in which the operator may be conveniently positioned. After the operator steers the harvesting aid onto a row of crops, the self-steering cutter head guides the machine along the row thereby severing individual crops as the harvesting aid advances along the row. The severed crops are grasped by the operator and positioned on an upwardly projecting stick. After a predetermined number of crops are disposed on the stick, the operator dislodges the stick from the harvesting aid thereby positioning it on the ground surface. Thereafter, the operator positions another stick in the stick support and proceeds to continue harvesting the crops.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
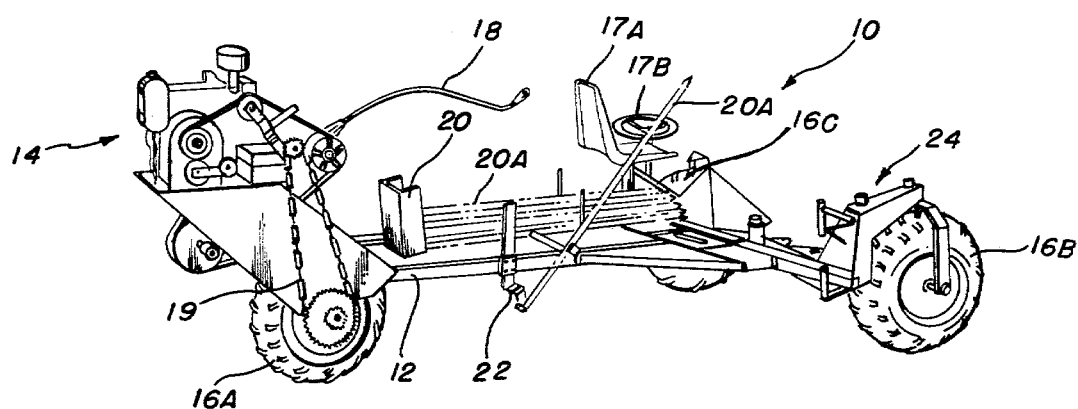
FIG. 1 is a side perspective view illustrating the harvesting aid according to the present invention.

As illustrated in FIG. 1, the present invention is directed to a harvesting aid 10 which includes a support frame 12 mounted on at least three wheels 16A, 16B, and 16C. The rear wheel 16A is operatively connected to a motor 14 by means of a chain drive 19. A control rod 18 is utilized to control the speed of the motor 14 and the forward movement of the harvesting aid 10.

An operator's seat 17A is positioned on the support frame 12 adjacent to the forward end thereof. Positioned in close proximity to the operator's seat 17A is a steering wheel 17B which may be utilized by the operator to initially steer the harvesting aid 10 onto a row of crops. After the harvesting aid 10 is positioned to be parallel with a row of crops, the steering of the harvesting aid is controlled by the self-steering cutter 30. In addition, the harvesting aid 10 may be incrementally advanced along the row by means of an automatic speed control device, not illustrated, disposed on the motor 14. In addition, the operator may control the forward speed of the harvesting aid 10 by means of the control rod 18.

As illustrated in FIG. 1, a stick support 22 is disposed adjacent to one side of the support frame 12. In addition, a stick storage rack 20 is positioned in close proximity to the operator's seat 17A. In this manner, an operator may readily grasp a stick 20A and position it in the stick support 22 so that crops which are to be harvested may be impaled thereon.

Figure 2:
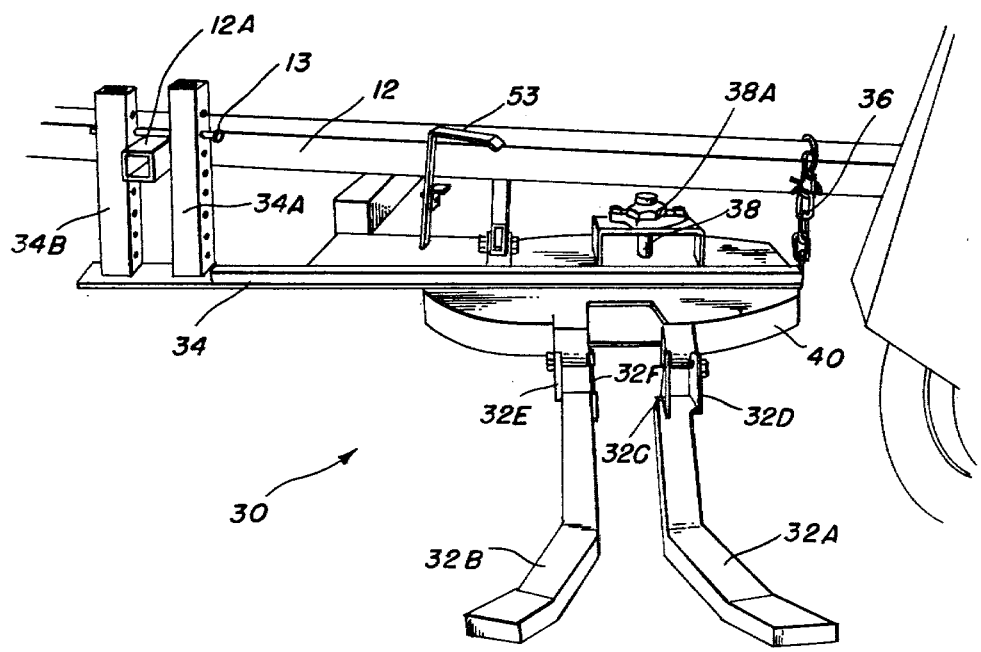
FIG. 2 is a partial front view illustrating the semi-floating, self-steering cutter head according to the present invention.
Figure 3:
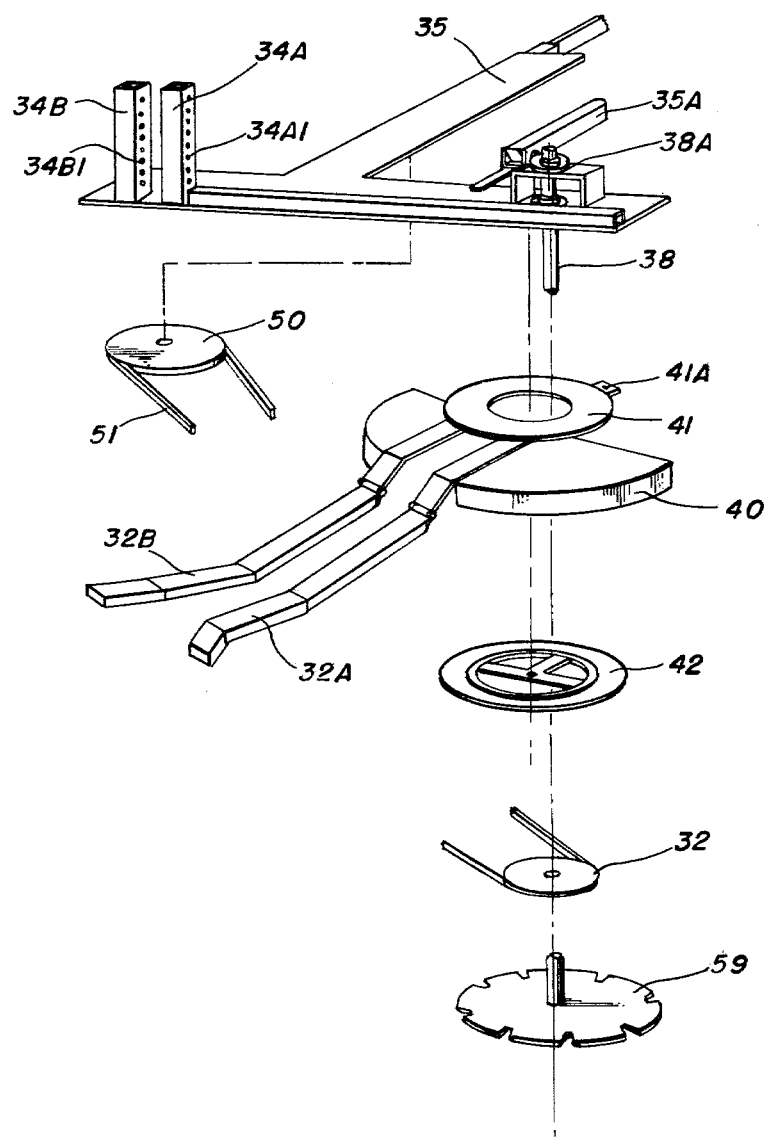
FIG. 3 is an exploded view illustrating the various components of the semi-floating, self-steering cutter head of the present invention.

With reference to FIGS. 2 and 3, a self-steering cutter 30 is illustrated. The self-steering cutter 30 includes a blade shield 40 and outwardly projecting guiding sensors 32A, 32B. The outwardly projecting guiding sensors 32A, 32B are hinged to the blade shield 40 by means of the hinges 32C, 32D and the hinges 32E, 32F, respectively. A cutter head frame 34 is provided with upwardly projecting height adjusted rods 34A, 34B. The height adjusted rods 34A, 34B include a plurality of openings 34A1 and 34B1, respectively, to aid in the adjustment of the cutter head frame 34 relative to the ground surface. In addition, a height adjustment chain 36 is disposed adjacent to the other end of the cutter head frame 34 to aid in the adjustment of the cutter head frame 34. Further, a main support arm 35 and an auxiliary support arm 35A project toward the rear of the self-steering cutter 30. The main support arm 35 and the auxiliary support arm 35A are designed to maintain the attitude of the self-steering cutter 30 thereby maintaining the self-steering cutter 30 at the proper angle for smooth operation without binding on the stalks of the crops to be harvested.

A top steering plate 41 is provided with a steering output point 41A. The top steering plate 41 is connected to the guidance sensors 32A, 32B and the blade shield 40. Forces transmitted to the guidance sensors 32A, 32B are transmitted to the top steering plate 41 which rotates to permit the steering output point 41A to transmit the forces to the steering linkage 24 thereby effecting steering of the harvesting aid 10.

A bottom steering plate 42 is provided which is concentric with the top steering plate 41. The bottom steering plate 42 is affixed to the cutter head frame 34 to maintain the top steering plate 41 in a fixed plane while permitting the top steering plate 41 to rotate and thereby accomplish steering of the harvesting aid 10.

A driving sheave 50 is rotatably mounted on the lower portion of the main support arm 35. A drive belt 51 is operatively connected to the driving sheave 50 and driven sheave 52. The driven sheave 52 is positioned on a saw shaft 38. The saw shaft 38 is rotatably mounted within a saw shaft bearing 38A which is disposed on the cutter head frame 34. Adjacent the lower end of the saw shaft 38 is a saw blade 39. As the driving sheave 50 rotates the drive belt 51, the driven sheave 52 rotates the saw shaft 38 thereby rotating the saw blade 39.

As illustrated in FIG. 2, the support frame 12 includes an outward projection 12A. The height adjustment rods 34A, 34B are spaced relative to each other to permit the projection 12A to extend therebetween. A pin 13 is disposed within openings 34A1, 34B1 in the height adjustment rods 34A, 34B to adjust the height of the cutter head frame 34 relative the support frame 12 and the projection 12A. Disposed adjacent the central portion of the cutter head frame 34 is a height adjustment lever 53. The height adjustment lever 53 may be actuated by the foot of the operator to raise the self-steering cutter 30 to project a greater distance above the ground surface. The height adjustment chain 36 is disposed adjacent the other end of the cutter head frame 34. The height adjustment chain 36 ensures the correct height of the self-steering cutter 30 above the ground surface.

Figure 4:
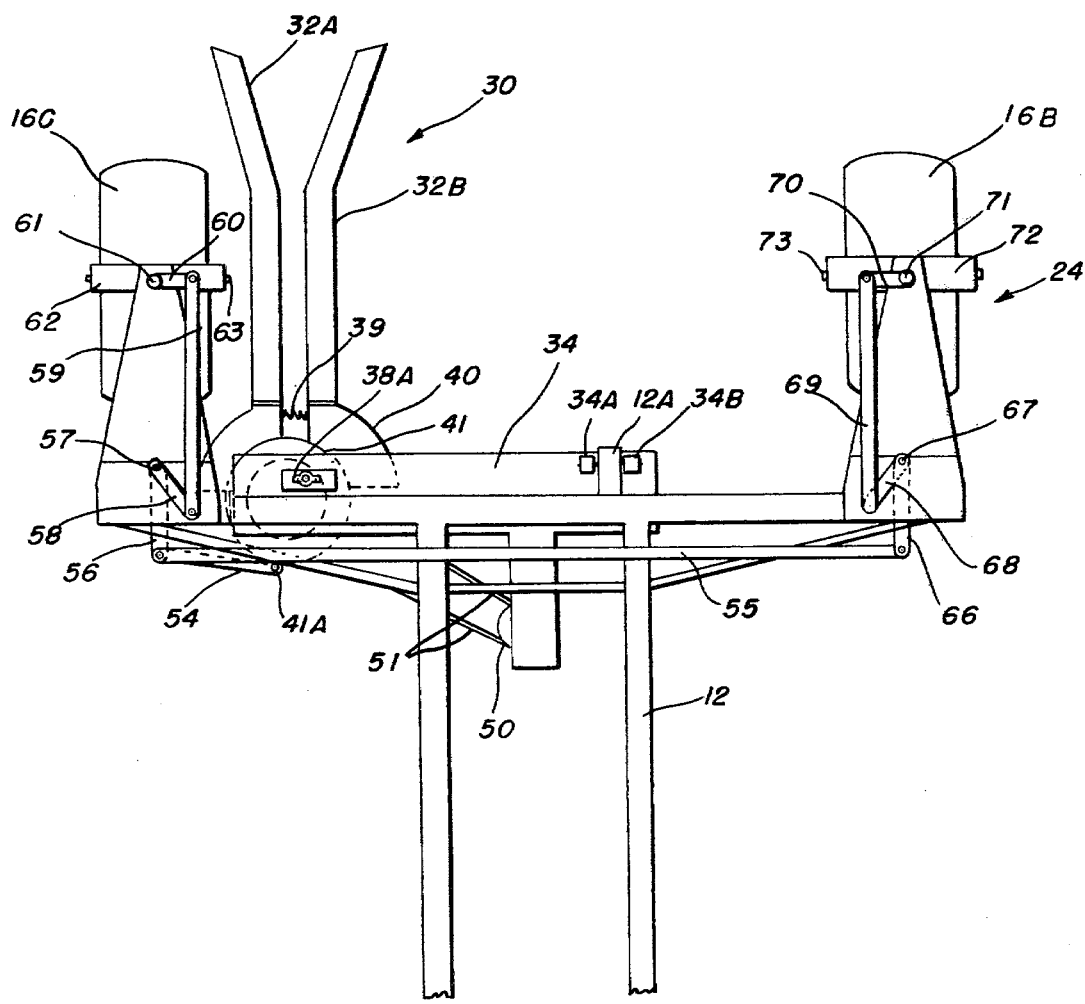
FIG. 4 is a top view illustrating the steering mechanism connected to the self-steering cutter head according to the present invention.

As illustrated in FIG. 4, the self-steering cutter 30 is illustrated in a top view. The interconnection between the output point 41A of the top steering plate 41 to the steering linkage 24 is clearly illustrated. An output point connecting rod 54 connects the output point 41A to the center tie rod 55 and the lower left steering crank arm 56. The lower left steering crank arm 56 is connected through a left pivot shaft 57 to a pivot shaft crank arm 58 and thereafter to a left tie rod 59. The left tie rod 59 is connected through a connecting rod 60 to a shaft 61 which is affixed to an axle support 62. The axle support 62 rotatably positions the axle 63 of the wheel 16C.

The right wheel 16B is connected to the output point 41A in a similar manner. More particularly, the connecting rod 54 is connected to the center tie rod 55 which is connected to the lower right steering crank arm 66. The lower right steering crank arm 66 is connected through a right pivot shaft 67 to a connecting rod 68. The connecting rod 68 is connected to a right tie rod 69 which is connected to a connecting rod 70. The connecting rod 70 is operatively connected to the shaft 71 which is affixed to the axle support 72. The axle support 72 rotatably positions the axle 73 of the wheel 16B. Like numerals in FIG. 4 correspond to like elements as described with reference to FIGS. 1–3.

In operation, the harvesting aid 10 is initially steered by the operator to be parallel with a row of crops. Thereafter, the operator may adjust the motor to intermittently advance the harvesting aid 10 along the row of crops. In an alternative mode of operation, the control rod 18 may be used to intermittently advance the harvesting aid 10 along the row of crops. The guidance sensors 32A, 32B are initially positioned so as to be disposed on either side of the stock portion of the row of crops. As the harvesting aid 10 advances along the row of crops, the guidance sensors 32A, 32B transmit forces to the top steering plate 41 which rotates in response to the forces transmitted thereto. Rotating the top steering plate 41 will effect a rotation of the steering output point 41A which transmits the forces to the steering linkage 24 to effect a steering of the harvesting aid 10.

As illustrated in FIG. 4, steering of the harvesting aid is effected in the following manner. After the forces are transmitted from the guidance sensors 32A, 32B to the top steering plate 41, the output point 41A transmits the forces to the connecting rod 54. The connecting rod 54 imparts movement to the lower left steering crank arm 56 and through the center tie rod 55 to the lower right steering crank arm 66. The forces transmitted thereto impart a motion to the connecting rods and tie rods so as to effect movement of the wheels 16C and 16B. More particularly, if a steering correction force is applied to the guidance sensors 32A, 32B which would result in a clockwise rotation of the top steering plate 41, the steering output point 41A would also rotate in a clockwise direction. This clockwise rotation would be transmitted through the lower left steering crank arm 56 and the lower right steering crank arm 66 and through the various tie rods and connecting rods to result in a clockwise rotation of both wheels 16B and 16C. Similarly, if the forces transmitted by the guidance sensors 32A, 32B would tend to rotate the top steering plate 41 in a counterclockwise direction, the various crank arms, connecting rods, and tie rods would impart a counterclockwise rotation to the wheels 16B and 16C.

As the harvesting aid 10 advances along a row of crops, the stock portion of the crops is severed adjacent the ground level. The severed crops are grasped by the operator positioned within the operator's seat 17A and are impaled on the stick 20A. After a predetermined number of crops are speared onto the stick 20A, the operator rotates the stick upwardly to disengage it from the stick support 22 thereby depositing the filled stick 20A onto the ground surface for field drying. The operator would then grasp an additional stick 20A positioned within the stick storage rack 20 and would position it within the stick support 22 for subsequent harvesting of severed crops.

The specific height of the self-steering cutter and the attitude may be controlled by the height adjustment rods 34A, 34B, the height adjustment chain 36, the height adjustment lever 53, the main support arm 35 and the auxiliary support arm 35A. The various members which control the height and the attitude may be adjusted very quickly to ensure the proper angle of the self-steering cutter 30 for smooth operation without binding on the stock stumps. In addition, the height adjustment chain 36 permits the self-steering cutter 30 to float upwardly if it strikes the ground, a stone, or other small object. In addition, the driving belt 51 is arranged relative to the driving sheave 50 and the driven sheave 52 to permit the self-steering cutter 30 to move in a vertical direction without effecting the operation of the saw blade 39.

As illustrated in FIGS. 2 and 3, the guidance sensor 32A is mounted on hinges 32C, 32D to the blade shield 40. Similarly, the guidance sensor 32B is mounted on hinges 32E, 32F to the blade shield 40. By mounting the guidance sensors 32A, 32B to the blade shield 40 in this manner, the guidance sensors are permitted to move vertically to compensate for irregularities in the ground surface and to float upwardly if they strike a stone or other small object. When the harvesting aid 10 is not in operation, the guidance sensors 32A, 32B may be pivoted upwardly to engage against the support frame 12 and thereby permit the operator to drive the harvesting aid 10 without the guidance sensors 32A, 32B engaging the ground surface.

The harvesting aid 10 according to the present invention is designed to permit an operator to harvest a large variety of row crops and is especially useful in harvesting tobacco crops. The harvesting aid 10 is mechanically reliable, relatively simple in construction and is not destructive to the crops.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A harvesting aid for harvesting row crops comprising:
    a support frame mounted on a plurality of ground engaging wheels;
    a motor means operatively connected to at least one ground engaging wheel to impel the support frame along the ground surface;
    steering linkage means connected to at least one ground engaging wheel to steer the support frame along the ground surface;
    a self-steering cutter adjustably mounted on the support frame and operatively connected to said steering linkage, said self-steering cutter including a top steering plate rotatably mounted thereto and a cutter blade for severing row crops as the harvesting aid is steered along a specific predetermined row of row crops;
    said self-steering cutter including outwardly projecting guidance sensors which are attached to said top steering plate, said guidance sensors being positioned to engage said specific predetermined row of row crops to selectively impart movement to the steering linkage means to steer the harvesting aid along the specific predetermined row of crops and being mounted for limited vertical movement; and
    adjustment means for adjusting said self-steering cutter relative to said support frame to adjust the height of said self-steering cutter above ground level enabling severing of the row crops in close proximity to the ground surface;
    said self-steering cutter and said adjustment means being constructed as an integral unit to enable steering of the harvesting aid along the specific predetermined row of row crops while severing the row crops in close proximity to the ground surface.

2. A harvesting aid according to claim 1, wherein said adjustment means includes at least one height adjustment rod slidably positioned relative to a projection on said support frame and a height adjustment chain adapted to be secured to said support frame.

3. A harvesting aid according to claim 2, and further including a cutter head frame on which said self-steering cutter, said height adjustment rod and said height adjustment chain are mounted.

4. A harvesting aid according to claim 2, and further including a main support arm and an auxiliary support arm for adjusting the attitude of the cutter blade.

5. A harvesting aid according to claim 1, wherein said guidance sensors are hinged to said top steering plate to permit vertical movement.

6. A harvesting aid according to claim 1, and further including a cutter head frame for mounting said self-steering cutter, a bottom steering plate being affixed to said cutter head frame, said bottom steering plate being mounted in engagement with said top steering plate while permitting rotation of said top steering plate.

7. A harvesting aid according to claim 1, and further including a cutter blade shield being operatively mounted adjacent said top steering plate and said cutter blade.

8. A harvesting aid according to claim 1, and further including a driving sheave being operatively connected to said motor means, to impart rotation thereto, said driving sheave being operatively connected to a driven sheave affixed to a cutter blade shaft to impart rotation to said cutter blade.

9. A harvesting aid according to claim 1, and further including an operator's seat affixed to said support frame and being positioned adjacent to said self-steering cutter.

10. A harvesting aid according to claim 8, and further including a control rod extending towards said operator's seat and operatively connected to said motor means to control the speed and movement of said harvesting aid.

11. A harvesting aid according to claim 1, wherein said top steering plate includes a steering output point operatively connected to said steering linkage means for transmitting forces detected by said guidance sensors to said steering linkage means to effect steering of said harvesting aid.

12. A harvesting aid according to claim 9, and further including a stick support affixed to said support frame for positioning a stick adjacent to said operator's seat on which severed crops are impaled.

13. A harvesting aid according to claim 12, and further including a stick storage rack affixed to said support frame and being positioned adjacent to said operator's seat.

14. A harvesting aid for harvesting row crops comprising:
- a support frame mounted on a plurality of ground engaging wheels;
- a motor means operatively connected to at least one ground engaging wheel to impel the support frame along the ground surface;
- steering linkage means connected to at least one ground engaging wheel to steer the support frame along the ground surface;
- a self-steering cutter adjustably mounted on the support frame and operatively connected to said steering linkage, and self-steering cutter including a top steering plate rotatably mounted thereto and a cutter blade for severing row crops as the harvesting aid is steered along a specific predetermined row of row crops;
- said self-steering cutter including outwardly projecting guidance sensors which are attached to said top steering plate, said guidance sensors being positioned to engage said specific predetermined row of row crops to selectively impart movement to the steering linkage means to steer the harvesting aid along the specific predetermined row of crops and being mounted for limited vertical movement;
- adjustment means for adjusting said self-steering cutter relative to said support frame to adjust the height of said self-steering cutter above ground level enabling severing of the row crops in close proximity to the ground surface;
- said self-steering cutter and said adjustment means being constructed as an integral unit to enable steering of the harvesting aid along the specific predetermined row of row crops while severing the row crops in close proximity to the ground surface;
- an operator's seat affixed to said support frame and being positioned adjacent to said self-steering cutter; and
- a stick support affixed to said support frame for positioning a stick adjacent to said operator's seat, an individual being positioned in said operator's seat is in visual contact with said stick on which severed crops are manually impaled.

15. A harvesting aid according to claim 14, wherein said adjustment means includes at least one height adjustment rod slidably positioned relative to a projection on said support frame and a height adjustment chain adapted to be secured to said support frame.

16. A harvesting aid according to claim 15, and further including a cutter head frame on which said self-steering cutter, said height adjustment rod and said height adjustment chain are mounted.

17. A harvesting aid according to claim 15, and further including a main support arm and an auxiliary support arm for adjusting the attitude of the cutter blade.

18. A harvesting aid according to claim 14, wherein said guidance sensors are hinged to said top steering plate to permit vertical movement.

19. A harvesting aid according to claim 14, and further including a cutter head frame for mounting said self-steering cutter, a bottom steering plate being affixed to said cutter head frame, said bottom steering plate being mounted in engagement with said top steering plate while permitting rotation of said top steering plate.

20. A harvesting aid according to claim 14, and further including a cutter blade shield being operatively mounted adjacent said top steering plate and said cutter blade.

21. A harvesting aid according to claim 14, and further including a driving sheave being operatively connected to said motor means, to impart rotation thereto, said driving sheave being operatively connected to a driven sheave affixed to a cutter blade shaft to impart rotation to said cutter blade.

22. A harvesting aid according to claim 21, and further including a control rod extending towards said operator's seat and operatively connected to said motor means to control the speed and movement of said harvesting aid.

23. A harvesting aid according to claim 14, wherein said top steering plate includes a steering output point operatively connected to said steering linkage means for transmitting forces detected by said guidance sensors to said steering linkage means to effect steering of said harvesting aid.

24. A harvesting aid according to claim 14, and further including a stick storage rack affixed to said support frame and being positioned adjacent to said operator's seat.

25. A harvesting aid according to claim 1 or 14, wherein said support frame is mounted on a rear wheel and two front wheels, drive means operatively connecting said motor means and said rear wheel and said steering linkage means being operatively connected to one of said front wheels.

* * * * *